United States Patent Office 2,940,969
Patented June 14, 1960

2,940,969

1 - SUBSTITUTED - 4 - [3 - (9 - XANTHYLIDENE)-PROPYL]PIPERAZINES AND 1 - SUBSTITUTED - 4 - [3 - (10 - THIAXANTHYLIDENE)PROPYL]-PIPERAZINES

Guido E. Bonvicino, Pearl River, N.Y., and Robert A. Hardy, Jr., Ridgewood, N.J., assignors to American Cyanamid Company, New York, N.Y., a corporation of Maine No Drawing. Filed July 18, 1957, Ser. No. 672,578

5 Claims. (Cl. 260—240)

This invention relates to new organic compounds and more particularly is concerned with novel 1-substituted-4-[3-(9-xanthylidene)propyl]piperazines and 1-substituted-4-[3-(10-thiaxanthylidene)propyl]piperazines which may be represented by the following general formula:

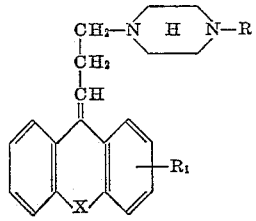

wherein X represents an oxygen or sulfur atom; $R_1$ represents a hydrogen atom, a halogen atom such as chlorine and bromine, a lower alkoxy radical such as methoxy, ethoxy, etc.; and R represents a lower alkyl radical such as methyl, ethyl, propyl and butyl. The compounds of this invention are valuable tranquilizing agents and consequently are useful in the chemotherapy of diseases of the psyche. The compounds, in addition, are useful as analgesics.

The compounds of this invention are made by dehydration of tertiary alcohols of the structure:

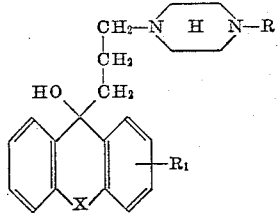

wherein X, R and $R_1$ have the meaning hereinbefore defined.

The ease of dehydration varies widely. With some of the novel compounds aqueous mineral acids such as hydrochloric acid, sulfuric acid, etc., at room temperature, effect the dehydration. Other members of this series, particularly the thiaxanthylidene compounds, are more resistant to dehydration. In such case, more vigorous dehydrating agents such as thionyl chloride, phosphorus oxychloride and the like may be used.

The intermediate tertiary alcohols are conveniently prepared by a Grignard reaction using a 1-substituted-4-(3-halopropyl)piperazine, magnesium and a substituted xanthone or thiaxanthone. The conditions for this reaction are not critical. A variety of solvents, commonly employed for Grignard reactions, such as ether, benzene, toluene, and xylene can be used. The useful temperature range varies widely. For convenience, the refluxing temperature of the solvent is generally used to insure completion of the reaction in a reasonable time. After the reaction is substantially complete, which usually requires from about 7 to 30 hours, the Grignard complex is decomposed. If desired, the 1-substituted-4-[3-(9-hydroxy-9-xanthyl)propyl]piperazine intermediates can be isolated from the organic phase by decomposition of the Grignard complex with neutral or alkaline reagents. In general, the 1-substituted-4-[3-(9-hydroxy-9-xanthyl)-propyl]piperazines must be isolated as the free bases because of their facile dehydration in the presence of mineral acids under mild conditions. The 1-substituted-4-[3-(10-hydroxy-10-thiaxanthyl)propyl]piperazines, however, are relatively more resistant to dehydration and are frequently isolated as their mineral acid salts. The intermediate tertiary alcohol may be reacted in situ with dehydrating agents as described above. The resulting 1-substituted-4-[3-(9-xanthylidene)propyl]piperazines and 1-substituted-4-[3-(10-thiaxanthylidene)-propyl]piperazines are ordinarily isolated as the dihydrochloride salts in crystalline form. However, they may be purified further by recrystallization from various organic solvents such as the lower aliphatic alcohols.

Other therapeutically useful acid addition salts such as the sulfate or acetate may be similarly made with other acids as, for example, sulfuric acid, acetic acid, etc.

Suitable 1 - substituted - 4 - (3 - halopropyl)piperazines which may be used in forming the novel compounds herein are 1-methyl-4-(3-chloropropyl)piperazine, 1-ethyl-4-(3-chloropropyl)piperazine and the like.

Among the suitable xanthones and thiaxanthones which may be used in reaction with the piperazines referred to above to produce the novel compounds of this invention, there may be mentioned xanthone, 2-methoxyxanthone, 2-chloroxanthone, 4-bromoxanthone, 2-ethoxyxanthone, 2-thiaxanthone, 2-chlorothiaxanthone, 2-methoxythiaxanthone, and 2-bromothiaxanthone.

The process by which the novel compounds may be prepared is illustrated schematically below, wherein in the reaction scheme, X, R and $R_1$ have the meaning hereinbefore given.

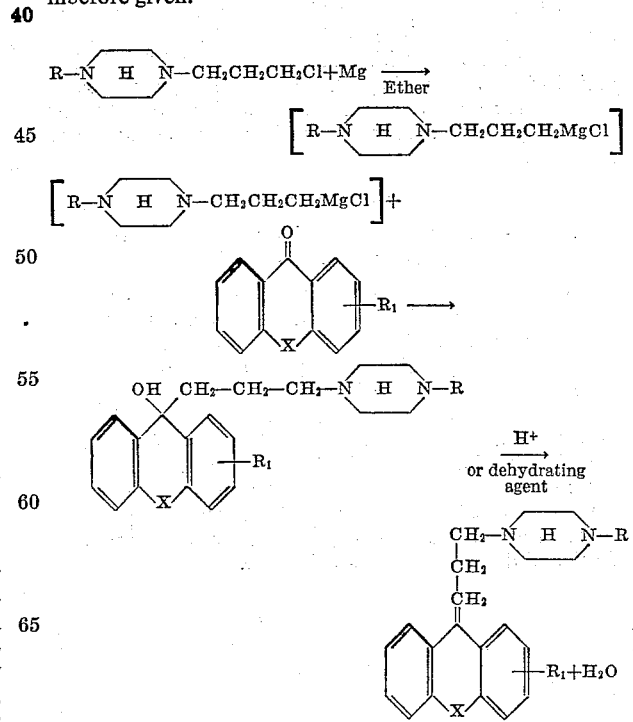

The invention will be described in greater detail in conjunction with the following specific examples.

EXAMPLE 1

*1-methyl-4-[3-(9-xanthylidene)propyl]piperazine dihydrochloride*

1.8 grams of magnesium are covered with 30 milliliters of ether and activated with a crystal of iodine. The Grignard reaction is started by adding 0.25 milliliter of ethyl bromide with warming. To this solution is added 1-methyl-4-(3-chloropropyl)piperazine, 13 grams in 40 milliliters of ether over a period of ten minutes. Only a small amount of magnesium dissolves. The reaction flask is then warmed for a few minutes and treated with a suspension of 7.84 grams of xanthone in 100 milliliters of anhydrous benzene and 40 milliliters of ether. The reaction mixture is then refluxed with constant stirring for twenty hours, cooled and decomposed with 100 ml. of cold 10% aqueous ammonium chloride. The ether-benzene layer is separated, and the aqueous layer extracted with ether. The ether washes are combined with the original ether-benzene layer and washed with water. The organic layer is extracted with 1 N aqueous hydrochloric acid. The aqueous extract is washed with ether and then made alkaline with potassium carbonate, while under a layer of ether. The ether extracts are combined, washed with water and dried over anhydrous magnesium sulfate. The dried ethereal solution is treated with anhydrous hydrogen chloride gas, then evaporated to dryness. The residue is recrystallized from absolute ethanol, yielding a product which decomposes at 243° C. After another recrystallization from absolute ethanol the product decomposes at 252° C.

EXAMPLE 2

*1-methyl-4-[3-(2-methoxy-9-xanthylidene)propyl]-piperazine dihydrochloride*

1-methyl-4-[3-(2-methoxy-9-xanthylidene)propyl]-piperazine dihydrochloride is prepared by reacting 2.4 grams of magnesium, 17.7 grams of 1-methyl-4-(3-chloropropyl)piperazine and 11.3 grams of 2-methoxyxanthone by the Grignard reaction as described in Example 1. The dihydrochloride salt is prepared by treating an alcoholic solution of the crude base with two molar equivalents of alcoholic hydrogen chloride; e.g., 1.7 grams of the crude base is dissolved in 10 milliliters of absolute ethanol and treated with 3.85 milliliters of 2.61 N alcoholic hydrogen chloride. The crystalline salt which separates is recrystallized from 15 milliliters of absolute ethanol, yielding a product which softens at 209° and decomposes at 211–213° C.

EXAMPLE 3

*1-methyl-4-[3-(2-chloro-10-thiaxanthylidene)propyl]-piperazine dihydrochloride*

1-methyl-4-[3-(2-chloro-10-thiaxanthylidene)-propyl]piperazine dihydrochloride is prepared by reacting 2.4 grams of magnesium, 17.7 grams of 1-methyl-4-(3-chloropropyl)piperazine and 12.3 grams of 2-chlorothiaxanthone by the Grignard reaction previously described in Example 1. The dihydrochloride salt is isolated as described in Example 2; e.g., 3 grams of the crude base in 20 milliliters of absolute ethanol is treated with 6.2 milliliters of 2.61 N alcoholic hydrogen chloride. The dihydrochloride salt is isolated and recrystallized twice from absolute ethanol. This product softens at 220° and decomposes at 247–249° C.

EXAMPLE 4

*1-methyl-4-[3-(2-methoxy-10-thiaxanthylidene)-propyl]piperazine dihydrochloride*

1-methyl-4-[3-(2-methoxy-10-thiaxanthylidene)-propyl]piperazine dihydrochloride is prepared by reacting 2.4 grams of magnesium, 17.7 grams of 1-methyl-4-(3-chloropropyl)piperazine and 12.1 grams of 2-methoxythiaxanthone by the Grignard reaction as described in Example 1. The product obtained is 1-methyl-4-[3-(2-chloro-10-hydroxy-10-thiaxanthyl)propyl]piperazine; it melts at 112–115° C. Dehydration is accomplished as follows: four and one half grams of this product are dissolved in 15 milliliters of concentrated hydrochloric acid and 45 milliliters of glacial acetic acid. The solution is heated under reflux for three hours. The solution is cooled and diluted with 75 milliliters of water and made strongly alkaline with 3 N sodium hydroxide (pH 11). The dehydrated base is extracted several times with ether. The ether extracts are combined and washed with water and dried over anhydrous potassium carbonate. The dried extract is evaporated to dryness leaving 3.7 grams of residue. This product is dissolved in 20 milliliters of absolute ethanol and treated with 7.7 milliliters of 2.61 N alcoholic hydrogen chloride. The solution is cooled in an ice bath and upon standing for a few hours, a crystalline product separates. After two recrystallizations from absolute ethanol the 1-methyl-4-[3-(2-methoxy-10-thiaxanthylidene)propyl]piperazine dihydrochloride decomposes at 225–226° C.

We claim:

1. A compound selected from the group consisting of 1-substituted-4-[3-(9-xanthylidene)propyl]piperazines and 1-substituted-4-[3-(10-thiaxanthylidene)propyl]piperazines, corresponding to the formula:

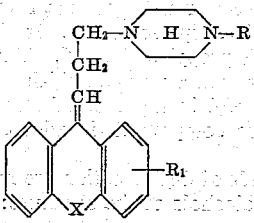

and acid addition salts thereof wherein X represents a member of the group consisting of oxygen and sulfur atoms, $R_1$ represents a member of the group consisting of hydrogen, halogen, and lower alkoxy radicals, and R represents a lower alkyl radical.

2. 1-methyl-4-[3-(9-xanthylidene)propyl]piperazine.

3. 1-methyl-4-[3-(2-methoxy-9-xanthylidene)-propyl]piperazine.

4. 1-methyl-4-[3-(2-chloro-10-thiaxanthylidene)-propyl]piperazine.

5. 1-methyl-4-[3-(2-methoxy-10-thiaxanthylidene)-propyl]piperazine.

References Cited in the file of this patent

UNITED STATES PATENTS

| | | |
|---|---|---|
| 2,676,971 | Cusic et al. | Apr. 27, 1954 |
| 2,838,509 | Cusic | June 10, 1958 |
| 2,861,987 | Martin et al. | Nov. 25, 1958 |